Oct. 1, 1935.    B. L. BOBROFF    2,015,917
SIGNAL LIGHT FOR AUTOMOTIVE VEHICLES
Filed July 7, 1930    2 Sheets-Sheet 1
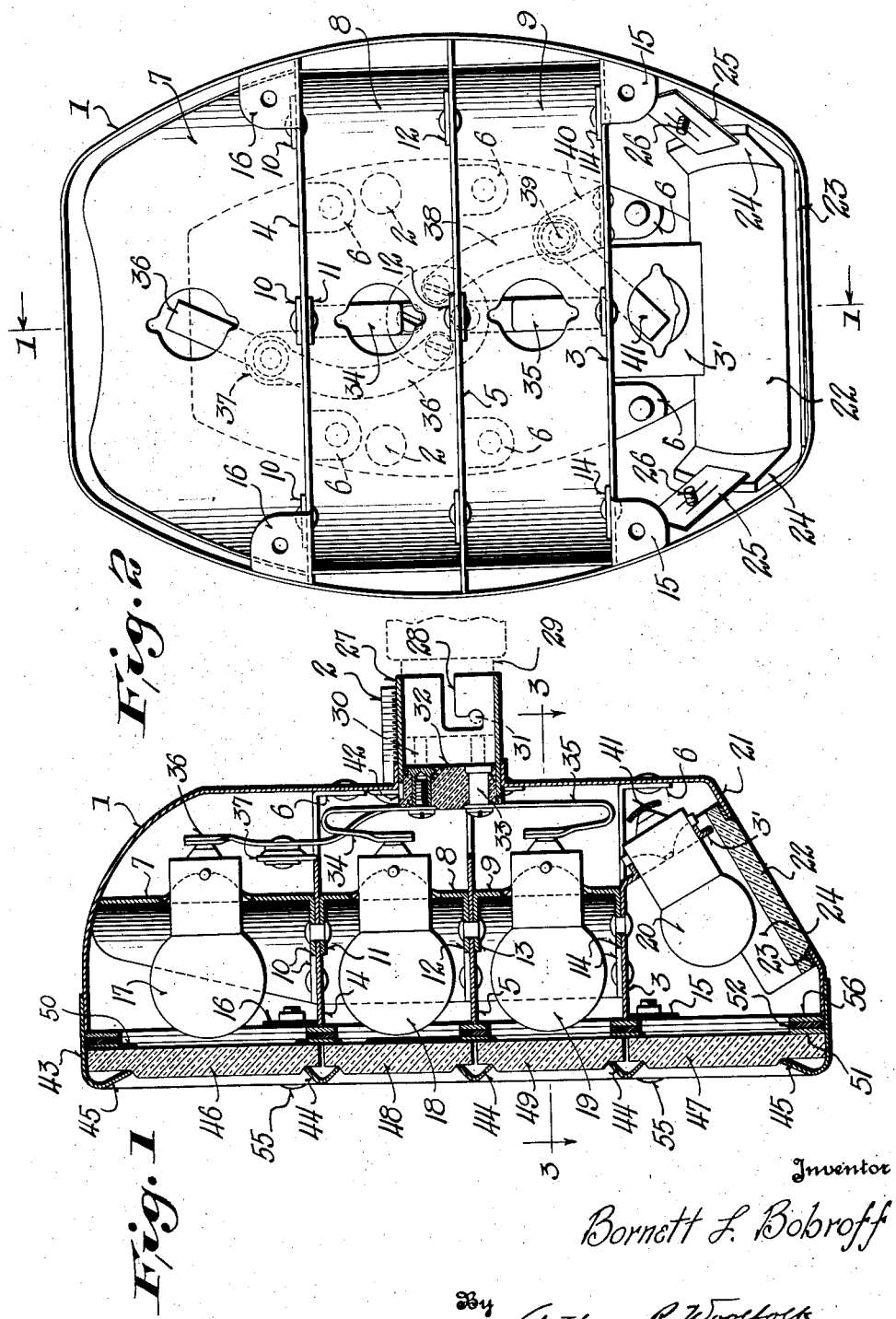
Inventor
Bornett L. Bobroff
By Arthur R. Woolfolk
Attorney Oct. 1, 1935.  B. L. BOBROFF  2,015,917
SIGNAL LIGHT FOR AUTOMOTIVE VEHICLES
Filed July 7, 1930  2 Sheets-Sheet 2
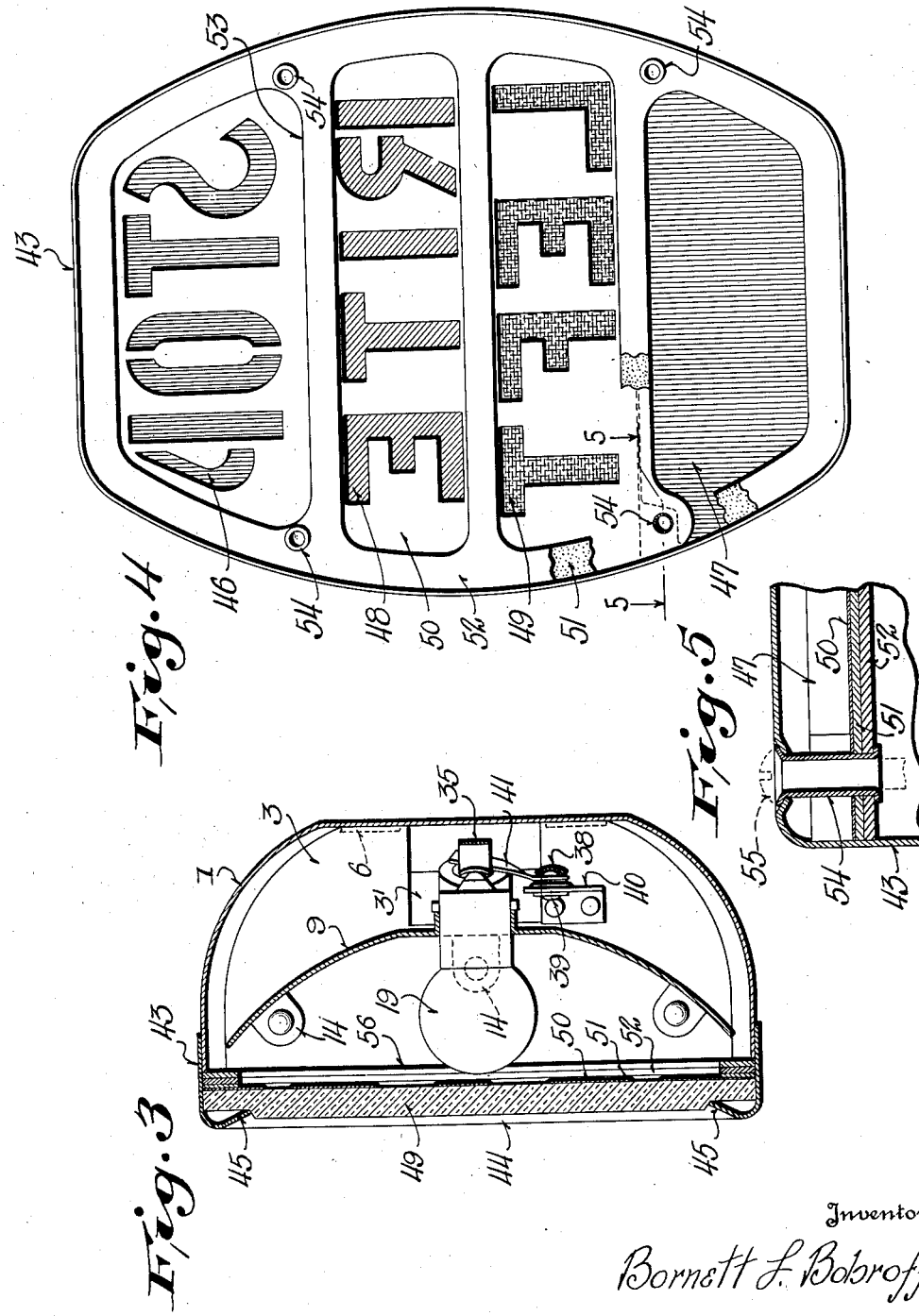
Inventor
Bornett L. Bobroff
By Arthur R. Woolfolk
Attorney Patented Oct. 1, 1935

2,015,917

UNITED STATES PATENT OFFICE 2,015,917

SIGNAL LIGHT FOR AUTOMOTIVE VEHICLES

Bornett L. Bobroff, Racine, Wis.

Application July 7, 1930, Serial No. 465,850

2 Claims. (Cl. 177—329)

This invention relates to automotive vehicle lights, and is particularly directed to a tail light.

Objects of this invention are to provide a combined tail light, stop light, and signal light, which may be attached to an automotive vehicle, preferably adjacent the rear of the vehicle, and which is adapted to give any one of a plurality of signals such as "Rite", "Left", and "Stop", for instance, and which is also adapted to serve as the tail light and which is also provided with means for illuminating a license plate.

Further objects are to provide a vehicle light which is adapted to give any one of a plurality of differently colored signals and to also display insignia, so that either or both the color or the insignia may be understood by a following driver.

While the construction is shown and described as applied to tail lights, it is apparent that it may be followed for either tail lights for other types of signal lights for automotive vehicles. In automotive vehicles it has been found that the signal lights such as the tail lights, are subjected to excessive vibration and that the parts frequently loosen. Further, the usual practice is to hold the glass panel between the flanged rim and the casing with the consequence that as soon as the rim slightly loosens, the glass will rattle and frequently break, or at least chip at its edges.

Further objects are to provide a construction in which the glass and rim are permanently held together as a unit and in a manner to protect the edges of the glass, so that the secure holding of the glass is not dependent upon the clamping action of the rim and casing as in previous constructions.

Further objects are to provide an automotive vehicle light in which a plurality of glass, or other transparent segments are held as a unitary construction with the removable rim, so that the rim may be removed for renewal of the lamps, the rim and glass segments being removable as a unit.

Further objects are to provide a construction in which a plurality of spring contact strips or fingers are attached to a substantially centrally located insulating block and extend to the several lamps, the contact strips being either anchored in channels in the insulating block or else anchored at two points to prevent shifting, and in which insulated units securely attach certain of the contact strips although permitting ready and rapid assembly of the parts.

Further objects are to provide a vehicle signal light which includes a casing provided with a plurality of division partitions, which may have reflecting portions, and which has a plurality of lamps, such lamps being located in different compartments and carried in sockets formed integrally with certain portions of apparatus such as the reflecting portions.

Further objects are to provide a signal light for an automotive vehicle in which the major portions are permanently joined by rivets, welding or other means so that they cannot shake apart in use even if subjected to excessive vibration, which will not rattle, and which still permits the ready renewal of the lamps.

An embodiment of the invention is shown in the accompanying drawings, in which:—

Figure 1 is a vertical sectional view through the signal light, such view corresponding to a section on the line 1—1 of Figure 2.

Figure 2 is a face view of the device with the cover, or face panel removed, and with the lamps removed.

Figure 3 is a transverse sectional view on the line 3—3 of Figure 1.

Figure 4 is a rear view of the cover with parts broken away.

Figure 5 is an enlarged sectional view on the line 5—5 of Figure 4.

Referring to the drawings, it will be seen that the device comprises a stamped metal casing 1 which is adapted for attachment to the automotive vehicle or to a plate carried thereby in any suitable manner as by means of the rearwardly projecting screws 2, see Figure 1, such screws being permanent and rigidly secured to the rear portion of the casing in which a plurality of partitions are provided and may comprise a lower partition 3 and upper partition 4 and an intermediate partition 5.

These partitions are rigidly secured within the casing in any suitable manner so as to form a permanent structure with the casing. The preferred manner of attaching the partitions is to provide rear ears 6 which are secured by rivets or by spot welding to the inner face of the rear wall of the casing.

The three partitions may extend transversely of the casing to divide the casing into four compartments, reflectors are preferably provided for at least three of the compartments. These reflectors are indicated by the reference characters 7, 8 and 9. The uppermost reflector, 7, is provided with forwardly turned ears 10. The reflector, 8, is provided with forwardly turned upper and lower ears, 11 and 12, and the reflector, 9, is provided with forwardly turned upper and lower ears, 13 and 14. Preferably, each set of ears is arranged in a group of three as shown most clearly in Figure 3, so as to securely retain the reflector in bowed or curved position or shape as shown in Figure 3.

The ears, 14, are secured by rivets or spot welding to the lowest partition, 3. The ears, 12 and 13, are similarly secured to the partition 5, and the ears 10 and 11 are similarly secured to the partition 4. If rivets are used, preferably one rivet will secure each of a pair of ears from the reflectors to the partitions 4 and 5 as shown most clearly in Figure 1.

This construction gives the utmost rigidity to the device and prevents rattling or loosening of any of these parts even after extended use.

The partitions 3 and 4 are provided with forward ears indicated at 15 and 16 respectively and most clearly shown in Figure 2. These ears are threaded to receive attaching screws for the cover as will hereinafter appear.

The reflectors 7, 8 and 9 are provided with rearwardly stamped sockets for the reception of the bases of the lamps 17, 18 and 19.

The bottom partition, 3 is provided with a downwardly turned lip 3' extending at an angle to the partition and provided with a socket for the reception of the base of the bottom lamp 20.

The bottom portion of the casing is formed as a slanting surface 21 and is provided with an aperture which is closed by means of a glass or other transparent plate 22, see Figures 1 and 2. Preferably the plate 22 is molded with a projecting part fitting within the aperture in the bottom wall 21 of the casing and it is also preferable to provide a cork gasket 23 between the edges of the plate and the adjacent portion of the casing. Preferably, the glass plate 22 is provided with upwardly projecting end portions 24, see Figure 2, which are held in place by means of the locking spring plates 25 into which screws 26 extend through the side walls of the casing 1. The spring plates 25 lock the screws in a well known manner and also afford a yielding pressure for holding the glass plate 22 in place as is obvious from an inspection of Figure 2.

The casing is provided with an approximately centrally located flanged opening through its rear wall within which a socket 27 is positioned and spot welded. This socket is provided with a bayonet slot 28 and is adapted to receive the plug, indicated in dotted lines at 29, of the cable for supplying current to the several lamps, such plug being provided with contact fingers 30, and being provided with a pin 31 adapted to interlock with the bayonet slot. This construction is most clearly shown in Figure 1.

An insulating lock or plug 32 is tightly pressed into the inner end of the sleeve or socket 27 and carries a plurality of contact members 33 which extend from one face to the other face of the plug and the rear ends are adapted to be engaged by the yielding contact fingers or plungers 30 of the plug 29. Preferably, four of these contact members 33 are provided, and in the preferred form such contact members are molded in place when the insulating plug 32 is formed.

The contact members 33 have threaded apertures, and the insulating plug 32 is provided with slots adjacent the upper and lowermost of these contact members within which the rear ends of spring fingers 34 and 35 are seated. These spring fingers are held in place by means of screws which extend into the contact members 33, and are prevented from turning out of place by means of the slight channels within which they are set as is obvious from an inspection of Figures 1 and 2. The spring fingers 34 and 35 form contact members and are looped backwardly upon themselves to provide yielding portions, engaging the center contacts of the lamps 18 and 19.

An upwardly extending spring finger or contact finger 36 is secured to one of the lateral contact members 33 as may be seen from Figure 2, and extends upwardly to a position suitable for engagement with the center contact of the uppermost lamp 17 as shown in Figure 1.

Inasmuch as this contact member 36 is relatively long it is attached to an ear 37 formed integrally with the partition 4, see Figure 1, by means of an insulated or bushed rivet. This construction holds the elongated contact finger 36 accurately in place.

A downwardly extending contact member or spring finger 38 is secured to the other laterally positioned contact member 33 as is apparent from Figure 1 and extends downwardly.

The end of the contact member 38 engages an insulated rivet 39 as may be seen from Figures 2 and 3. The insulated rivet 39 extends through an ear 40 attached to the lowest partition 3 and the member 38 is electrically connected to a downwardly extended short contact finger 41, see Figures 2 and 3. The contact finger 41 engages the center contact of the lamp 20 as may be seen from Figure 1.

It is preferable to slightly cup or bow the free ends of the contact fingers so that they will seat upon the center contacts of the several lamps. Also it is preferable to slightly bow the free end of the contact member 38 as may be seen from Figure 3 so that it will seat upon the rivet 39.

From the construction thus far given it is apparent that the contact members are firmly held in place and provide yielding spring fingers adapted to engage the center contacts of the several lamps. No wires whatsoever are required to be positioned within the signal light and consequently there is no danger of short circuit due to abrasion of any wire or other insulated member of this type. Instead, the springy or yielding contact fingers are provided. This construction is most easily assembled and provides a permanent and reliable construction, no part of which is likely to get out of order.

It is to be noted that the insulating plug or member 32 is tightly forced into the sleeve 27 and preferably the insulating plug is provided with a key 42, see Figure 1, formed integrally therewith which fits within a corresponding notch formed in the sleeve 27 to thereby prevent the plug from turning and to assure the correct positioning of the plug during assembly.

A cover or face plate is provided for the casing and comprises a rim 43 which fits over the outer edge of the casing as shown in Figures 1 and 3. This rim extends completely around the device and is provided with bowed or V-shaped transverse members 44 preferably formed integrally therewith. These transverse members 44 are positioned in alignment with the three partitions as shown in Figure 1. Preferably, the rim 43 is flanged and provided with an inwardly turned lip 45, see Figure 1.

A plurality of transparent members or glass signals are positioned within the rim 43 and preferably these glass or other transparent signals comprise an upper signal 46, a lower signal 47, and intermediate signals 48 and 49. These signals are preferably formed with projecting portions which fit between the inturned marginal lip 45 and the lips of the V-shaped division members 44 as shown in Figure 1, to thus hold or position the several glass panels or signals.

A stencil plate 50 is positioned rearwardly of certain of the glass panels, for example, rearwardly of the glass panels 46, 48 and 49. This stencil plate may be formed of metal or other suitable material and as shown in Figure 4 is provided with cutout portions forming the words, "Stop", "Rite", and "Left". These cutout portions are located opposite the lamps 17, 18 and 19 respectively.

Immediately rearwardly of the stencil plate 50 is positioned a cork gasket 51, see Figures 1 and 4, which is clamped in place by means of the backing member 52, such member having division strips 53 as shown in Figure 4 and it is preferable to locate the division strips or transverse partitions 53 of the backing member 52 directly in front of the partitions 3, 4 and 5.

The cover is in reality a unitary structure and the parts are held together by means of hollow rivets 54 which extend through the rim 43 and the backing member 52 and clamp the several parts of the cover tightly together so as to form a unitary, permanent structure.

This construction provides a unitary cover, a fragment of such construction is shown in Figure 5. From Figure 4 it is clear that the hollow rivets 54 also pass through the stencil plate 50 and thus provide a secure positioning for such stencil plate. The cover may be positioned and removed as a unit and no danger of misplacing of the glass panels or stencil plate or other portions of the cover can exist as the cover is a unitary structure.

The cover is held in place by means of a plurality of screws 55, see Figures 1 and 5, which extend through the hollow rivets 54 and which are threaded into the lugs or ears 15 and 16. Preferably, the hollow rivets 54 are countersunk and screws with countersunk heads are employed as shown in Figure 5. If desired lockwashers may be provided for each of the screws, including as well the screws holding the contact fingers in place.

It is also a preferred construction to provide an inner cork gasket 56, see Figure 1, between the backing member 52 and the adjacent edges of casing and partitions.

It will be seen that a novel form of signal light has been provided which is suitable for use on automotive vehicles and which is not deranged even by excessive jarring throughout a great length of time. The parts are so related and are so firmly secured that no rattling can develop and no loosening of the parts can occur. The reflectors brace the partitions and provide a very rigid construction. The partitions are firmly secured in a permanent fashion to the casing and cannot loosen up.

However, the lamps may be readily removed by removing the four screws 54, the composite cover coming off as a unit.

It is preferable to form the bottom panel 47 and the upper panel 46 of red glass and to form the panels 48 and 49 of green and amber glass respectively. The bottom panel acts as a tail light in the usual manner and the upper red panel 46 serves as a stop light. The right and left signals may be readily distinguished as the right signal shows as a green light and the left signal as an amber light, in addition to the display of the normally invisible letters or words or other insignia. Obviously, the words "Rite" and "Left" may be replaced by arrows or other insignia if so desired.

The use of different colors for the several signals has been found highly advantageous as there can be no confusion between the amber and green, left and rite signals and the red stop signal.

While the colors chosen for illustration are the preferred colors, it is obviously within the province of this invention to vary the colors if desired.

It is to be noted particularly that the device lends itself to quantity production, that it is cheap to make, and that it is easy to assemble.

It is to be noted further that the device is free from any disfiguring features and provides an attractive, serviceable and reliable signal light for automotive vehicles.

Although this invention has been described in considerable detail, it is to be understood that the description is intended as illustrative rather than limiting as the invention may be variously embodied and is to be interpreted as claimed.

I claim:—

1. A signal light for an automotive vehicle comprising a casing, said casing having a hollow body portion and having a plurality of transversely extending partitions dividing said body portion into a plurality of compartments, reflecting means positioned between said partitions and rigidly secured thereto to thereby brace said partitions, a plurality of lamps located one in each of said compartments in front of said reflecting means, a cover for said body portion comprising a front panel formed of a plurality of spaced light transmitting sections distinct and separate from each other and spaced apart in line with said partitions, a marginal flange portion slidably fitting over said body portion and constituting a part of said front panel, said marginal flange having integral transverse channel-shaped members interlocking with said light transmitting sections, said front panel including a backing plate provided with marginal portions and with transverse portions located directly inwardly of said channel-shaped transverse portions and behind said light transmitting portions and resting upon and bearing against said partitions, whereby said partitions are braced one from the other by said reflecting portions and whereby that portion of the front panel at the adjacent margins of the light transmitting portions is braced by direct contact with the several partitions.

2. A signal light for an automotive vehicle comprising a casing, said casing having a hollow body portion and having a plurality of transversely extending partitions dividing said body portion into a plurality of compartments, curved reflectors positioned between said partitions and rigidly secured thereto to thereby brace said partitions against lateral deflection, a plurality of lamps located one in each of said compartments in front of said reflector means, a unitary cover for said body portion comprising a front panel having a plurality of transversely extending spaced, light transmitting sections distinct and separate from each other and spaced apart in line with said partitions, said cover having a plurality of transversely extending members overlapping adjacent margins of said light transmitting sections and contacting directly with said partitions, and means for holding said unitary cover on said casing.

BORNETT L. BOBROFF.